United States Patent [19]

Morse

[11] Patent Number: 4,555,600
[45] Date of Patent: Nov. 26, 1985

[54] VANDAL-RESISTANT SHIELD FOR TELEPHONE KEYPAD

[75] Inventor: Milton Morse, Fort Lee, N.J.

[73] Assignee: APM Corporation, Englewood, N.J.

[21] Appl. No.: 544,391

[22] Filed: Oct. 21, 1983

Related U.S. Application Data

[63] Continuation-in-part of Ser. No. 381,905, May 25, 1982, and a continuation-in-part of Ser. No. 299,509, Sep. 4, 1981, and a continuation-in-part of Ser. No. 286,063, Jul. 23, 1981, and a continuation-in-part of Ser. No. 261,647, May 7, 1981, , and a continuation-in-part of Ser. No. 236,757, Feb. 23, 1981.

[51] Int. Cl.⁴ .......................................... H01H 13/70
[52] U.S. Cl. ............................... 179/184; 200/302.2; 179/178
[58] Field of Search ............ 179/178, 184, 186, 90 K; 200/302.2, 340

[56] References Cited

U.S. PATENT DOCUMENTS

| | | | |
|---|---|---|---|
| 3,932,722 | 1/1976 | Obata et al. | 200/302.2 |
| 4,018,999 | 4/1977 | Robinson | 200/302.2 |
| 4,059,737 | 11/1977 | Gergaud | 200/302.2 |
| 4,117,279 | 9/1978 | Schoemer | 200/302.2 |
| 4,180,711 | 12/1979 | Hirata et al. | 200/159 B |
| 4,184,321 | 1/1980 | Tarusawa | 200/302.2 |
| 4,194,105 | 3/1980 | Hodges | 200/159 B |
| 4,203,013 | 5/1980 | Serras-Paulet | 200/302.2 |
| 4,439,646 | 3/1984 | Bouvrande | 200/302.2 |

Primary Examiner—Gene Z. Rubinson
Assistant Examiner—L. C. Schroeder
Attorney, Agent, or Firm—Edward R. Weingram

[57] ABSTRACT

A standard keypad comprises a rigid support plate having a front face and formed with an array of throughgoing apertures, respective push-buttons projecting at the apertures through the plate past the front face thereof, and a continuous flexible membrane overlying the front face and formed in front of each of the push-buttons with a relatively thick projecting portion. Thus the membrane seals the apertures around the buttons while allowing same to be depressed via the projecting portions. The switch associated with the push-buttons urges the push-buttons and the overlying thick portions forward from the front face. A shield assembly has a rigid shield plate formed with an array of throughgoing apertures aligned with and generally identical to those of the support plate and having a rear face confronting the front face of the support plate and an opposite front face. The projecting portions of the membrane project forward through the apertures of the shield plate past the front face thereof. The shield plate is itself secured in front of the membrane with the apertures aligned. Respective rigid caps fitted over the thickened portions project forward through the shield-plate apertures and each have an outwardly projecting flange extending generally parallel to and lying between the plates and of greater size than the respective shield-plate aperture. These flanges normally lie against the rear face of the shield plate.

23 Claims, 8 Drawing Figures

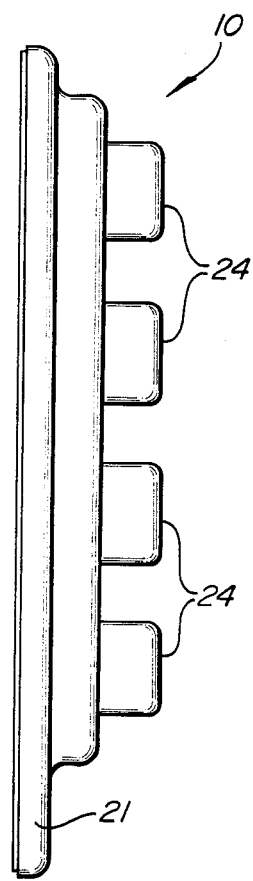
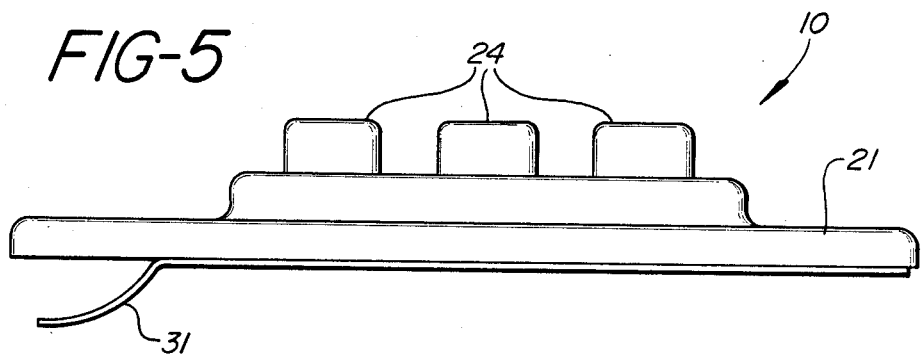

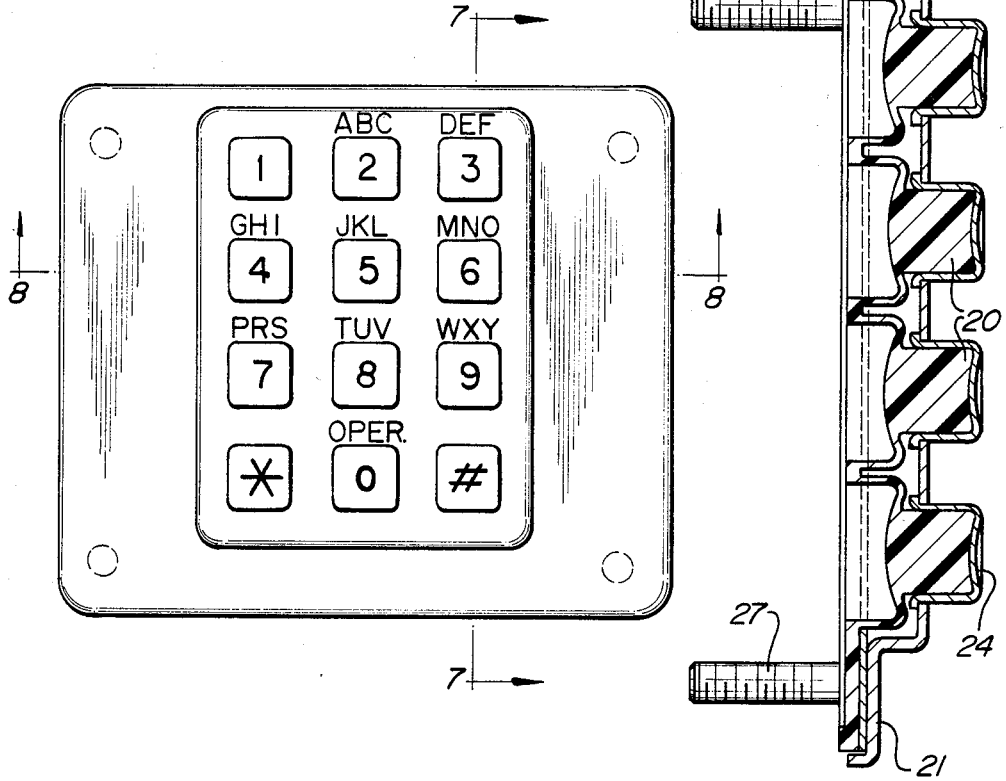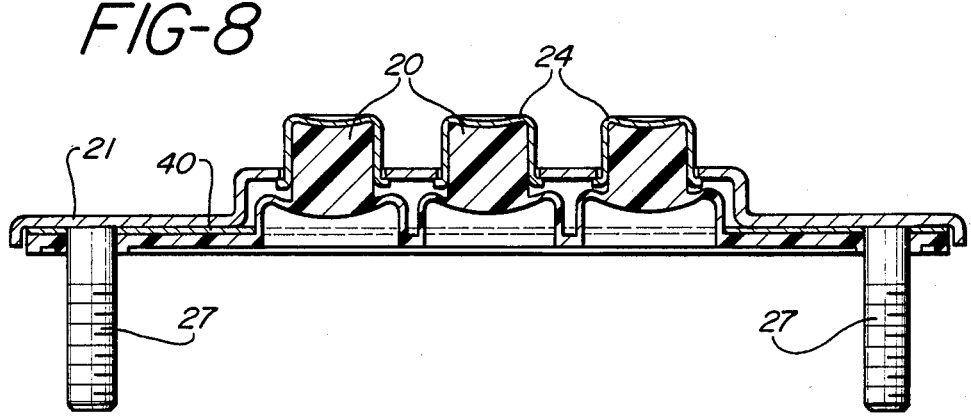

4,555,600

VANDAL-RESISTANT SHIELD FOR TELEPHONE KEYPAD

RELATED APPLICATIONS

This application is a continuation-in-part of applications Ser. Nos. 236,757, filed Feb. 23, 1981; 261,647, filed May 7, 1981; 286,063, filed July 23, 1981; and 299,509, filed Sept. 4, 1981; and 381,905, filed May 25, 1982.

FIELD OF THE INVENTION

The present invention relates to a shield for a keypad. More specifically this invention concerns a vandal-resistant shield assembly used to protect a telephone keypad, especially of the type associated with a push-button coin-operated telephone set.

BACKGROUND OF THE INVENTION

Within recent years, telephone sets incorporating push-button arrays, commonly including twelve such push-buttons, have come into widespread use and have largely supplanted the previously common rotary dial-type telephone. The individual push-buttons comprising such a telephone set array normally project through the cover of the telephone, or a portion of the telephone cover. The remainder of the switching array is contained beneath this outer shell of the telephone set. Such telephone sets are also employed in coin-operated pay stations which are generally located in high volume traffic areas where they are subject to damage from environmental hazards, incuding especially dust, liquid, and the like which can readily seep through the openings surrounding the individual push-button keys and cause damage, in some cases irreparable damage, to the underlying switching device. In such installations, there is also a great likelihood of damage resulting from vandalism, and a protective cover which is permanently attached, and not easily removed, and yet allowing effective operation of the push-buttons is very desirable.

While several types of covering elements have been previously proposed for use in connection with push-button type telephones, these have not fully addressed the foregoing problem of providing a protective envelopment of the push-button array to prevent damage. For example, patents such as U.S. Pat. Nos. 3,739,105; 3,927,282; 4,002,855; and 3,345,769, have been concerned with a variety of problems including arrangement for facilitating actuation of the buttons by varying spacing of the actuating means for the individual push-buttons, or in the case of U.S. Pat. No. 3,345,769, providing a means for supporing message pads or the like.

In my aforementioned applications a protective covering device is disclosed which provides a flexible sheet or membrane that overlies the pushbuttons. In front of each key this membrane is formed with a thickened region or projection that itself normally bears indicia identifying the particular key. The membrane is continuous, so that it completely seals in the delicate underlying switches.

Such an arrangement has not, however, proven highly vandal resistant. The elastomeric sheet is normally adhesively bonded to the front face of the support plate so that it can be peeled off simply by starting at a corner and working across. This exposes the delicate underlying push-button mechanism, and makes the phone a likely candidate for vandalizing and destruction by the elements.

Another problem with this known arrangement is that the buttons can wear and become illegible. They are mainly made of the same relatively soft material as the seal membrane, so that normal use alone is capable of wearing them down.

OBJECTS OF THE INVENTION

It is therefore an object of the present invention to provide an improved keypad shield assembly.

Another object is the provision of such a keypad shield assembly which overcomes the above-given disadvantages, and which is highly resistant to vandalism and wear.

A further object is to provide a keypad shield assembly that is particularly adapted to use on a public or outdoor pushbutton-type telephone.

SUMMARY OF THE INVENTION

The instant invention is used with a standard keypad that comprises a rigid support plate having a front face and formed with an array of throughgoing apertures, respective telephone push-buttons projecting at the apertures through the plate past the front face thereof.

In accordance with the invention an assembly is provided which includes a continuous flexible membrane which overlies the front face of the telephone support plate and is formed in front of each of the push-buttons with a relatively thick protruding tab portion. Thus, the membrane seals the apertures around the push-buttons while allowing the same to be depressed via the protruding tab portions of the membrane. Means such as the switches associated with the push-buttons urge the push-buttons and the overlying tab portions of the membrane forward from the front face.

The shield assembly of this invention further includes a rigid shield plate formed with an array of throughgoing apertures aligned with and generally identical to those of the support plate and having a rear face confronting the front face of the support plate and an opposite front face. The tab portions of the membrane project forward through the apertures of the shield plate past the front face thereof. The shield plate is itself secured in front of the membrane with the apertures aligned. Respective rigid caps fitted over the protruding tab portions project forward through the shield-plate apertures and each have an outwardly projecting flange extending generally parallel to and lying between the plates and of greater size than the respective shield-plate aperture. These flanges are urged forward against the rear face of the shield plate by the underlying protruding portions of the membrane, and in turn by the telephone push buttons.

In such an assembly the relatively delicate membrane is not exposed at all, while still effectively preventing any leakage aroaund the push-buttons through the support plate, e.g. the telephone faceplate. Only the rigid caps and shield plate are exposed, and these elements can be quite rugged. The shield plate of this invention is typically made of steel, and the membrane is of an elastomeric material such as a silicone rubber. This combination of materials makes an extremely durable shield that seals very tightly.

In accordance with another feature of this invention the shield-plate apertures and caps are complementarily polygonal, normally square. The membrane is formed at each push-button with a respective protruding portion which has a height greater than that of the rigid cap which covers same and projects through the shield plate. This maintains the flange of the covers in good contact with the shield plate to provide a relatively close seal. Additionally the shield plate apertures are formed by being punched through from the underside of the plate, i.e. from the side which lies adjacent the membrane. This produces a shoulder or burr about the outwardly facing periphery of the apertures, making it difficult for a vandal to insert a pointed object into the space between the caps and the shield plate.

In addition, the height of the capped projections above the shield plate is designed to be less than the total available travel of the underlying telephone push-button which is moved by pressure on the capped projection. Accordingly, even when the distal end of the capped projection is flush with the outward face of the shield plate, the telephone push-button has not quite bottomed. This assures that a vandal will not damage the switching mechanism even by impacting the capped projections with a flat hard object—notably the telephone receiver.

According to a further feature of this invention the caps taper forward from the flanges and fit snugly within the respective shield-plate apertures when the respective flanges abut the rear face thereof. Thus the caps effectively seal the shield-plate apertures when in the fully out position.

The shield plate of the present invention has a backwardly turned outer peripheral rim. The membrane is recessed within this rim, making it virtually impossible to pry off the assembly according to the invention.

The keypad shield assembly further has means for securing the membrane and the shield plate to the front face of the support plate. This means can be a layer of adhesive on the back face of the membrane. It may also be constituted by a plurality of threaded studs projecting back from the back face of the shield plate through the membrane and support plate.

DESCRIPTION OF THE DRAWING

The above and other features and advantages will become more readily apparent from the following, reference being made to the accompanying drawing in which:

FIGS. 4 and 5 are side and front elevational views of the assembly of FIG. 1;

FIG. 6 is a plan view of a further embodiment of a shield assembly according to the present invention;

FIG. 7 is a cross-sectional view of the assembly of FIG. 6, taken along line 7—7; and FIG. 8 is a cross-sectional view of the assembly of FIG. 6, taken along line 8—8 thereof.

SPECIFIC DESCRIPTION

Figure 1:
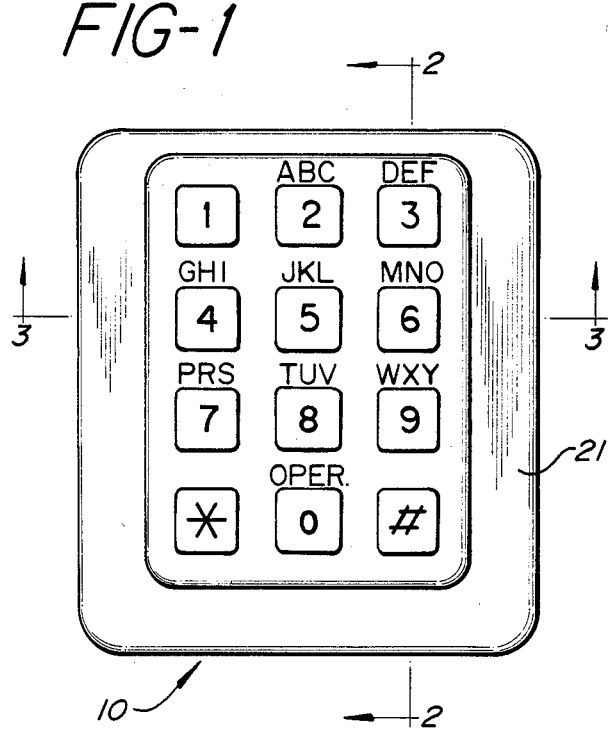
FIG. 1 is a view of the shield assembly according to this invention prior to installation.
Figure 2:
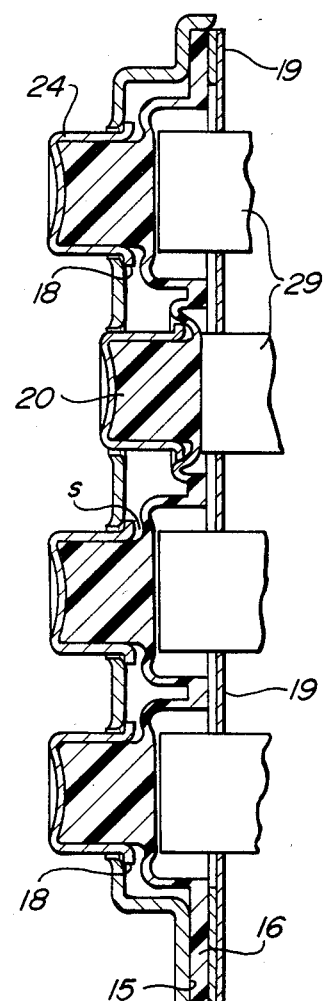
FIG. 2 is a large-scale section taken along line 2—2 of FIG. 1, showing the shield assembly of this invention, when installed at a telephone.
Figure 3:
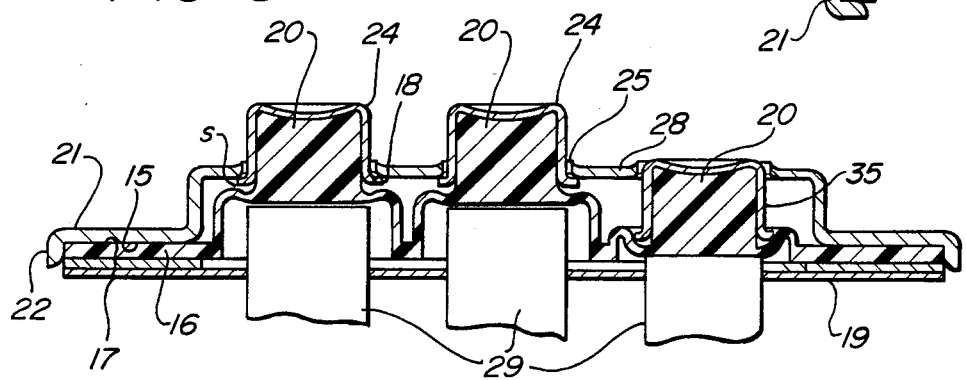
FIG. 3 is a further large-scale section of the shield assembly of this invention when installed, the view being taken and corresponding along the line 3—3 of FIG. 1.

As seen especially in FIGS. 1 through 3, a retrofit-type keypad shield assembly 10 according to the present invention has a rectangular metal plate 21, typically of stainless steel, that lies generally in and defines a plane. An annular centering rim 22 projects back from the plane at the outer periphery of the plate 21 and a central and rectangular raised portion 28 projects oppositely forward from the plane, offset toward what is normally the upper edge of the plate 21 to leave space for a phone-number legend. This raised portion 28 in turn is formed with a regular array of twelve generally square apertures 25 of the size and shape standard in a telephone, and with rounded corners.

A flexible silicone-rubber membrane 16 has a front face 17 lying against a back face 15 of the shield plate 21 and normally adhered thereto by a heavy-duty adhesive. The thickness of this membrane 16 plus that of any adhesive on it is about equal to the rearward projection of the rim 22 for completely enclosing of the membrane when the assembly is mounted, as will be described below.

Membrane 16 is formed with a plurality of upwardly projecting or protruding button-like portions 20. As seen in FIGS. 2 and 3, these portions 20 directly overlie the push buttons 29 of the underlying telephone set when the assembly is mounted to the telephone faceplate 19 through which push buttons 20 protrude.

The buttons of most telephone keypads have a depression in the center of each key and, therefore, as best seen in FIGS. 7 and 8, the underface of each part 20 preferably has a convexity which fits into the concavity of the telephone buttons 29, thus reducing the possibility of excessive wear of the silicone rubber portion 20.

The face of membrane 16 non-adjacent plate 21 may be provided with a layer of adhesive that is originally covered by a strip sheet 31 (FIG. 5) as is disclosed in my copending application Ser. No. 236,757; or an intermediate gasket which is adhesive on each face (and which prior to use is covered with strip sheets) may be used to adhere the assembly to face plate 19. This type of construction is set forth in my copending application Ser. No. 299,509. The adhesive used in all of the foregoing constructions may be of the self-curing type that forms an extremely strong bond.

Fitted snugly over each projecting portion 20 of membrane 16 is a respective key cap 24, made e.g. of 24-gauge stainless steel. Each cap 24 is of prismatic cup shape and has an annular side wall or skirt 35 terminating at an outwardly turned flange or rim 18. These side walls 35 flare slightly backward, that is they are inclined at an angle of several degrees to the vertical axis of cap 24, and can fit snugly and complementarily within the respective apertures 25 with the flanges 18 lying flat against the inner face 17 of the plate 21 at the raised portion 28. The projections 20 fit snugly within the backs of the square caps 24 and the membrane 16 is molded such that the caps 24 are urged into their outer positions shown in FIGS. 2 and 3 drawing for all but the "6" key.

In addition, each cap 24 is axially internally slightly shorter than the height of the respective projection 20 above the membrane 16, leaving a space s. This maintains the flange of the covers in good contact with the shield plate to provide a relatively good seal. Additionally the shield plate apertures are formed by being punched through from the underside of the plate, i.e. from the side which lies adjacent the membrane. This produces a shoulder or burr about the outwardly facing periphery of the apertures, making it extremely difficult for a vandal to insert a pointed object into the space between the caps and the plate.

In addition, the height of the capped projections above the shield plate is designed to be less than the total available travel of the underlying telephone push button, which is moved by pressure on the capped projection. Accordingly, even when the distal end of the capped projection is flush with the outward face of the shield plate, the telephone push-button has not quite bottomed. This assures that a vandal will not damage the switching mechanism even by impacting the capped projections with a flat hard object—notably the telephone receiver. The face of each cap 24 is dished to prevent a finger from slipping off it and to center each cap on the respective projection 20, whose front end face is complementarily concave.

Each cap 24 bears appropriate indicia, here that of a push-type telephone pad, although of course the instant invention could equally well be used for any other type of heavy-duty keypad, such as provided on a self-service gasoline pump. The indicia can be stamped in and filled with a phosphorous-base ink that glows in the dark.

Normally the assembly of this invention is available in stick-on and in bolt-on models, although it is of course possible to use both fastenings at the same time.

The bolt-on embodiment of the invention is set forth in FIGS. 6 through 8, where bolts 27 are seen projecting from plate 21. These serve to secure the assembly to the telephone faceplate 19 (FIGS. 1-3). These bolts also go through a metal back-up plate 40 which backs the membrane 16. The shield plate 21 overlies plate 40 and can be secured thereto by adhesive or other means.

The arrangement of this invention therefore presents nothing but metallic surfaces to the exterior, making it extremely rugged and virtually impossible to permanently mark or scratch. The numerals stamped directly in the key caps can be expected to last a long time, even in heavy service. At the same time the assembly is wholly watertight so that it will keep the delicate telephone switches dry and otherwise protected from the elements.

While the present invention has been particularly seet forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:
1. In combination with a keypad comprising:
   a rigid support plate having a front face and formed with an array of throughgoing apertures;
   respective push-buttons projecting at the apertures through the plate past the front face thereof;
   a continuous flexible membrane overlying the front face and formed at each of the push-buttons with a relatively thick projecting portion in front of the respective pushbuttons, whereby the membrane seals the apertures around the buttons while allowing same to be depressed via the thick portions; and
   means urging the pushbuttons and the overlying thick portions forward from the front face;
a shield assembly comprising:
   a rigid shield plate formed with an array of throughgoing apertures aligned with and generally identical to those of the support plate and having a rear face confronting the front face of the support plate and an opposite front face, the thick projecting portions of the membrane projecting forward through the apertures of the shield plate past the front face thereof;
   means for securing the shield plate in front of the membrane with the apertures aligned; and
   respective rigid caps fitted over the thickened portions, projecting forward through the shield-plate apertures, and each having an outwardly projecting flange extending generally parallel to and lying between the plates and of greater size than the respective shield-plate aperture, the means urging the respective flanges forward against the rear face of the shield plate.

2. The keypad shield assembly defined in claim 1, wherein the urging means includes respective push-button switches.

3. The keypad shield assembly defined in claim 1, wherein the shield plate is of steel.

4. The keypad shield assembly defined in claim 1, wherein the membrane comprises an elastomer.

5. The keypad shield assembly defined in claim 1, wherein the shield-plate apertures and caps are complementarily polygonal.

6. The keypad shield assembly defined in claim 5, wherein the shield-plate apertures and caps are generally square.

7. The keypad shield assembly defined in claim 5, wherein the projecting portions of said membrane have an axial length greater than the exact length of said caps, whereby said portions by projecting through said plate apertures maintain the flanges of said caps against the back face of said apertures.

8. The assembly of claim 7, wherein said apertures are formed by said plate being punched from the bottom side thereof to provide a burr about the outwardly facing periphery of said apertures, whereby to provide a barrier to attempts to insert tools or the like between said caps and plate.

9. The keypad shield assembly defined in claim 1, wherein the caps taper forward from the flanges and fit snugly within the respective shield-plate apertures when the flange abuts the rear face thereof.

10. The keypad shield assembly defined in claim 1, wherein the shield plate has a backwardly turned outer peripheral rim.

11. The keypad shield assembly defined in claim 1, further comprising
   securing means for securing the membrane and the shield plate to the front face of the support plate.

12. The keypad shield assembly defined in claim 11, wherein the securing means for the support plate is a layer of adhesive on the back face of the membrane.

13. The keypad shield assembly defined in claim 11, wherein the securing means for the support plate is a plurality of threaded studs projecting back from the back face of the shield plate through the membrane and support plate.

14. A shield assembly for use with a keypad of the type which includes a rigid support plate having a front face and formed with an array of throughgoing apertures; and respective push-buttons projecting at the apertures through the plate past the front face thereof, and being urged forward from the front face by switching means associated therewith; said shield assembly comprising:
   a continuous flexible membrane adapted to overlie the front face of said support plate, and formed at each of the push-buttons with a relatively thick protruding button-like portion in front of the respective push-buttons, whereby the membrane seals the apertures around the buttons while allowing same to be depressed via the said protruding portions; and a rigid shield plate formed with an array of throughgoing apertures aligned with and generally identical to those of the support plate and having a rear face confronting the front face of the support plate and an opposite front face, the projecting portions of the membrane projecting forward through the apertures of the shield plate past the front face thereof;

means for securing the shield plate in front of the membrane with the apertures aligned; and respective rigid caps fitted over the thickened portions, projecting forward through the shield-plate apertures, and each having an outwardly projecting flange extending generally parallel to and lying between the plates and of greater size than the respective shield-plate aperture, said keypad push-buttons urging the respective flanges forward against the rear face of the shield plate.

15. The keypad shield assembly defined in claim 14, wherein the shield plate is of steel.

16. The keypad shield assembly defined in claim 14, wherein the membrane comprises a resilient elastomer.

17. The keypad shield assembly defined in claim 14, wherein the shield-plate apertures and caps are complementarily polygonal.

18. The keypad shield assembly defined in claim 17, wherein the shield-plate apertures and caps are generally square.

19. The keypad shield assembly defined in claim 14, further comprising securing means for securing the membrane and the shield plate to the front face of the support plate of said keypad.

20. The keypad shield assembly defined in claim 18, wherein the securing means is a layer of adhesive.

21. The keypad shield assembly defined in claim 18, wherein the securing means is a plurality of threaded studs projecting back from the back face of the shield plate through the membrane and keypad support plate.

22. The keypad shield assembly of claim 14, wherein the apertures of said shield plate are punched through said plate from the side thereof adjacent said membrane, whereby the periphery of said apertures non-adjacent said membrane carries an upwardly directed ridge presenting a barrier to penetration of a tool or the like between an aperture and the cap passing therethrough.

23. The keypad assembly of claim 14, wherein the maximum axial projection of said caps from said apertures is less than the travel of the underlying keypad push-buttons, whereby sudden depression of said caps as a result of an impact blow to render same flush with said shield plate, will not effect complete bottoming of said pushbuttons.

* * * * *